(12) United States Patent
Prakash et al.

(10) Patent No.: US 8,566,233 B2
(45) Date of Patent: Oct. 22, 2013

(54) DEVICE, SYSTEM, AND METHOD FOR LOCATION-BASED PAYMENT AUTHORIZATION

(75) Inventors: Gyan Prakash, Beaverton, OR (US); Saurabh Dadu, Tigard, OR (US); Selim Aissi, Beaverton, OR (US); Ramesh Pendakur, Gaston, OR (US); Paritosh Saxena, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 113 days.

(21) Appl. No.: 12/846,622

(22) Filed: Jul. 29, 2010

(65) Prior Publication Data

US 2012/0030110 A1    Feb. 2, 2012

(51) Int. Cl.
  G06Q 40/00  (2012.01)
  G07D 11/00  (2006.01)
  G07F 19/00  (2006.01)

(52) U.S. Cl.
  CPC ............... *G06Q 40/00* (2013.01); *G07D 11/00* (2013.01); *G07F 19/00* (2013.01)
  USPC .............. 705/39; 705/35; 705/44; 235/379; 235/380; 235/381; 235/382; 235/383; 455/410; 455/411; 455/412.1; 455/412.2

(58) Field of Classification Search
  CPC .......... G06Q 40/00; G07D 11/00; G07F 19/00
  USPC ................ 705/39, 35, 44; 235/379–383; 455/410–412.2
  See application file for complete search history.

(56) References Cited

U.S. PATENT DOCUMENTS

| | | | |
|---|---|---|---|
| 5,147,685 A | 9/1992 | Hanson | |
| D339,396 S | 9/1993 | Roberto | |
| 7,657,489 B2 | 2/2010 | Stambaugh | |
| 7,832,636 B2 * | 11/2010 | Heffez et al. | 235/382 |
| 2003/0046289 A1 | 3/2003 | Balasubramanian et al. | |
| 2003/0182194 A1 | 9/2003 | Choey et al. | |
| 2003/0212620 A1 * | 11/2003 | Blagg | 705/35 |
| 2004/0122685 A1 | 6/2004 | Bunce | |

(Continued)

FOREIGN PATENT DOCUMENTS

| | | |
|---|---|---|
| JP | 2007188234 A | 7/2007 |
| JP | 2011508924 A | 3/2011 |

(Continued)

OTHER PUBLICATIONS

"Point of Sale", Wikipedia, The Free Encyclopedia, retrieved on Apr. 2, 2011, Webpage available at: <http://en.wikipedia.org/wiki/Point_of_Sale>.

(Continued)

*Primary Examiner* — Kirsten Apple
*Assistant Examiner* — Scott S Trotter
(74) *Attorney, Agent, or Firm* — Barnes & Thornburg LLP

(57) ABSTRACT

A device, system, and method for location-based payment authorization includes receiving a payment request for an order submitted from a mobile computing device via an e-commerce vendor website. A location of the mobile computing device is determined based on location data. In one embodiment, the payment request is authorized or denied based on whether the e-commerce vendor website has been authorized for the determined location of the mobile computing device.

20 Claims, 5 Drawing Sheets

(56) References Cited

U.S. PATENT DOCUMENTS

| | | |
|---|---|---|
| 2005/0125296 A1 | 6/2005 | Tidwell et al. |
| 2006/0194592 A1 | 8/2006 | Clough |
| 2007/0174082 A1* | 7/2007 | Singh .............................. 705/1 |
| 2007/0184818 A1 | 8/2007 | Clough |
| 2008/0052395 A1 | 2/2008 | Wright et al. |
| 2009/0271306 A1 | 10/2009 | Pierson |
| 2010/0049615 A1 | 2/2010 | Rose et al. |
| 2010/0106263 A1 | 4/2010 | Charania |
| 2010/0138345 A1 | 6/2010 | Lekhtman et al. |

FOREIGN PATENT DOCUMENTS

| | | |
|---|---|---|
| JP | 2012506587 A | 3/2012 |
| JP | 2002352165 A | 12/2012 |
| WO | 2009085045 A1 | 7/2009 |
| WO | 2010046659 A2 | 4/2010 |
| WO | 2012015615 A3 | 2/2012 |

OTHER PUBLICATIONS

International Search Report and Written Opinion received for PCT Patent Application No. PCT/US2011/044320, mailed on Mar. 8, 2012, 10 pages.

Office Action received for Japanese Patent Application No. 2012-527117, mailed on Jul. 16, 2013, 2 pages of Japanese Office Action and 2 pages of unofficial English translation.

* cited by examiner

LOCATION AUTHORIZATION POLICY

| LOCATION | AUTHORIZED VENDORS | AUTHORIZED MAXIMUM | OTHER CONDITIONS |
|---|---|---|---|
| HOME CITY | MYBANK.COM<br>EBAY.COM | UNLIMTED<br>$2,500.00 | NONE |
| HOME STATE | AMAZON.COM<br>BUY.COM | $1,000.00<br>$500.00 | NONE |
| UNITED STATES | DINNER.COM<br>AIRFLIGHTS.COM | $1,000.00<br>$5,000.00 | PURCHASE PERIOD LIMITATION |
| MUMBAI, INDIA | AIRFLIGHTS.COM | $2,000.00 | PURCHASE PERIOD LIMITATION |
| TOKYO, JAPAN | AIRFLIGHTS.COM | $2,000.00 | PURCHASE PERIOD LIMITATION |
| CHINA | CHINAHOTEL.COM | $250.00 | PURCHASE PERIOD LIMITATION |
| OTHER | NONE | $0.00 | N/A |

FIG. 2

| LOCATION AUTHORIZATION POLICY ||||
| AUTHORIZED VENDORS | LOCATION | AUTHORIZED MAXIMUM | OTHER CONDITIONS |
| --- | --- | --- | --- |
| MYBANK.COM | HOME CITY<br>HOME STATE | UNLIMITED<br>$1000.00 | NONE<br>NONE |
| EBAY.COM | HOME CITY<br>HOME STATE | $2500.00<br>$1000.00 | NONE<br>NONE |
| AMAZON.COM | HOME CITY<br>HOME STATE<br>UNITED STATES | UNLIMITED<br>$1000.00<br>$500.00 | NONE<br>NONE<br>PURCHASE PERIOD |
| AIRFLIGHTS.COM | UNITED STATES<br>MUMBAI, INDIA<br>TOKYO, JAPAN<br>CHINA | UNLIMITED<br>$2,000.00<br>$2,000.00<br>$1500.00 | PURCHASE PERIOD |

FIG. 3

DEVICE, SYSTEM, AND METHOD FOR LOCATION-BASED PAYMENT AUTHORIZATION

BACKGROUND

E-commerce websites provide virtual storefronts from which customers can purchase goods or services. E-commerce websites are generally globally accessible allowing the customer to conduct a purchase from virtually anywhere in the world. Such purchase transactions are typically effected using credit/charge accounts or other money accounts (e.g., a bank account) of the customer. To do so, the customer supplies his/her account information to the e-commerce website. The e-commerce website communicates with a payment authorization server to receive authorization of the payment. The payment authorization server typically verifies the account and ensures the requested currency amount of the purchase is not over the credit limit of the account. However, online purchase transactions remain susceptible to account fraud.

Account fraud, such as credit card fraud, occurs when an unauthorized individual uses a credit card or other account to effect a purchase. In many circumstances, credit card fraud and other account fraud involves purchases made from a location outside the customer's home location (e.g., outside the credit card holder's home location). As such, account fraud is particularly troublesome in regard to e-commerce purchases because such purchases can be made from virtually anywhere in the world.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 2 is a simplified block diagram of one embodiment of a location authorization policy database used in the system of FIG. 1;

FIG. 3 is a simplified block diagram of another embodiment of the location authorization policy database of FIG. 2;

DETAILED DESCRIPTION OF THE DRAWINGS

Figure 1:
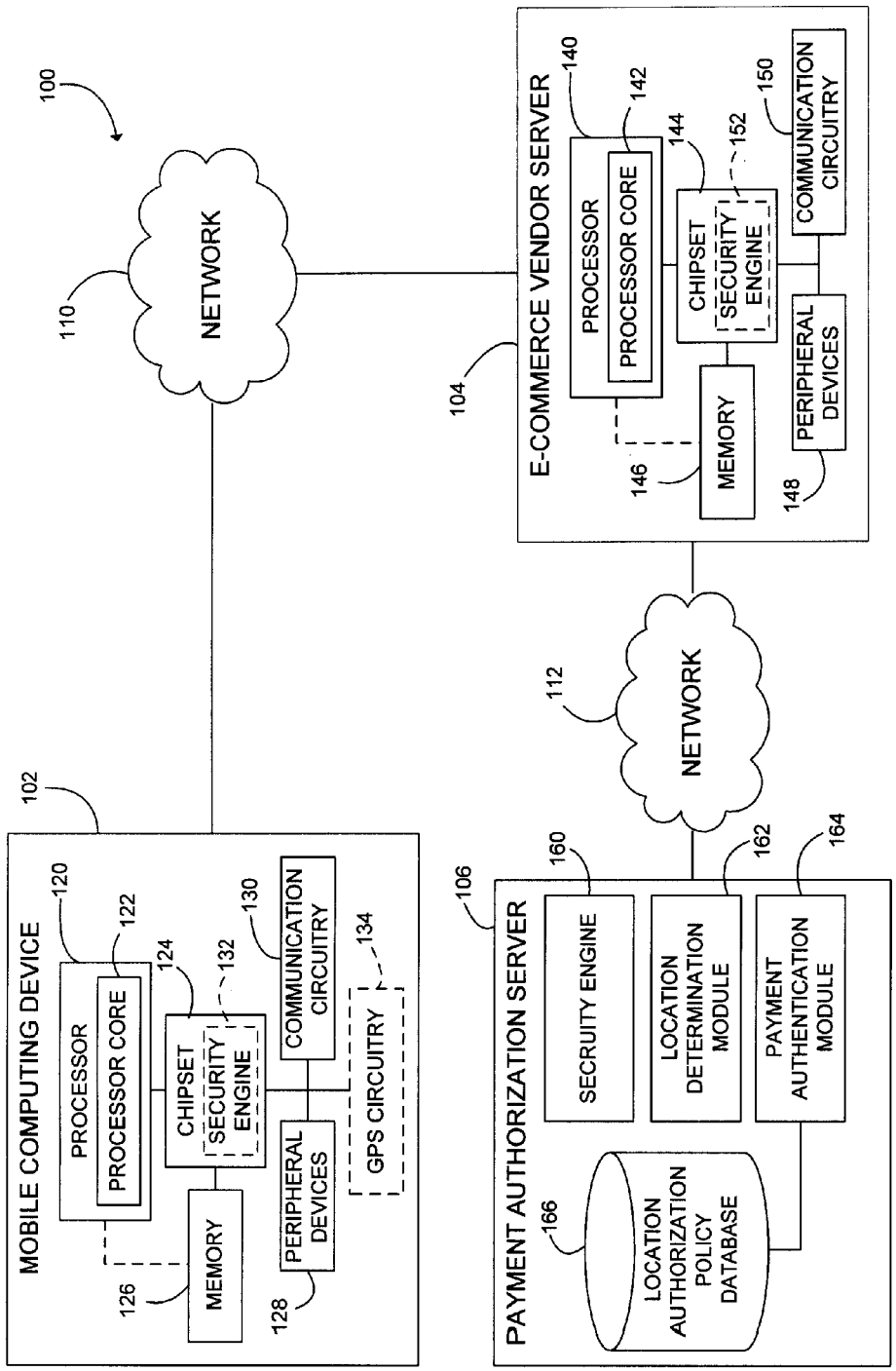
FIG. 1 is a simplified block diagram of one embodiment of a system for payment authorization of e-commerce transactions based on the location of a mobile computing device.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention implemented in a computer system may include one or more bus-based interconnects between components and/or one or more point-to-point interconnects between components. Embodiments of the invention may also be implemented as instructions stored on a tangible, machine-readable medium, which may be read and executed by one or more processors. A tangible, machine-readable medium may include any tangible mechanism for storing or transmitting information in a form readable by a machine (e.g., a computing device). For example, a tangible, machine-readable medium may include read only memory (ROM); random access memory (RAM); magnetic disk storage media; optical storage media; flash memory devices; and others.

Referring now to FIG. 1, a system 100 for location-based payment authorization of e-commerce transactions includes a mobile computing device 102, one or more e-commerce vendor servers 104, and a payment authorization server 106. In use, as discussed in more detail below, a user of the mobile computing device 102 may interact with the e-commerce vendor server 104 to place an order for goods and/or services over a network 110. Because the computing device 102 is mobile, such orders may be placed from various locations around the world. The user typically submits account information of a credit/charge or other money account, such as a bank account, to the e-commerce vendor server 104. Additionally, the e-commerce vendor server 104 may obtain location information indicative of the location of the mobile computing device 102 at the time of submission of the order for the goods and/or services. Such location information may be embodied as direct location information that directly identifies the location of the mobile computing device 102 such as, for example, the Global Positioning System (GPS) coordinates of the mobile computing device 102, coordinate data of the mobile computing device 102 determined from a cellular triangulation procedure, or other direct location data. In other embodiments, the location information may be embodied as indirect location information from which the location of the mobile computing device 102 may be determined such as, for example, the Internet Protocol (IP) address of the mobile computing device or the Base Set Service Identifier (BSSID) of an access point (e.g., a wireless access router) used by the mobile computing device 102 to place the order. In some embodiments, the vendor server 104 (or the payment authorization server 106) communicates with other servers and/or computing devices to obtain the location information.

In response to the order placed by the mobile computing device 102, the vendor server 104 communicates with the payment authorization server 106 over a network 112 to request payment for the order. To do so, the vendor server 104 may transmit the payment request and account information to the payment authorization server 106. Additionally, in embodiments in which the e-commerce vendor server 104 obtained the location information of the mobile computing device 102 (e.g., the IP address), the vendor server 104 also transmits the location data to the payment authorization server 106. In response, the payment authorization server 106 determines the location of the mobile computing device 102 and determines whether to authorize the payment request based on the determined location. To do so, the payment authorization server 106 may cross-reference the location data to the location of the mobile computing device 102 depending on the type of location data used. Additionally, the determined location may have varying granularity depending on the particular implementation and location data used. For example, the determined location may be embodied as location coordinates (e.g., GPS coordinates), a street address, a city, a state, a country, or other data that identifies the location of the mobile computing device 102.

The payment authorization server 106 may determine whether to authorize the payment request by comparing the determined location of the mobile computing device 102 and the e-commerce vendor website to a location authorization policy. That is, the location authorization policy may correlate authorized e-commerce vendor websites to particular locations. As such, if the mobile computing device 102 is attempting to make a purchase via an e-commerce website that is not authorized for the current location of the computing device 102 (e.g., outside the country of the user), the payment authorization server 106 will deny the payment request. In this way, credit card fraud and other account fraud may be reduced by validating the location of the mobile computing device 102 to a list of allowed locations for the particular e-commerce website.

Although only one mobile computing device 102, one e-commerce vendor server 104, one payment authorization server 106, one network 110, and one network 112 are illustratively shown in FIG. 1, the system 100 may include any number of mobile computing device 102, one e-commerce vendor server 104, one payment authorization server 106, and networks 110, 112 of similar or dissimilar architecture. For example, the mobile computing device 102 may be configured to communicate with multiple e-commerce vendor servers 104 to place orders with each e-commerce vendor. Additionally, each e-commerce vendor server 104 may communicate with various payment authorization servers 106 depending on the type of payment account (e.g., VISA, MASTERCARD, bank account, etc) used by the user to pay for the order.

The mobile computing device 102 may be embodied as any type of mobile computing device capable of performing the functions described herein. For example, the mobile computing device 102 may be embodied as a cellular phone, a smart phone, a mobile internet device, a handheld computer, a laptop computer, a personal digital assistant, a telephony device, or other portable computing device. In the illustrative embodiment of FIG. 1, the mobile computing device 102 includes a processor 120, a chipset 124, a memory 126, one or more peripheral devices 128, and communication circuitry 130. In some embodiments, several of the foregoing components may be incorporated on a motherboard of the mobile computing device 102, while other components may be communicatively coupled to the motherboard via, for example, a peripheral port. Furthermore, it should be appreciated that the mobile computing device 102 may include other components, sub-components, and devices commonly found in a computer and/or computing device, which are not illustrated in FIG. 1 for clarity of the description.

The processor 120 of the mobile computing device 102 may be embodied as any type of processor capable of executing software/firmware, such as a microprocessor, digital signal processor, microcontroller, or the like. The processor 120 is illustratively embodied as a single core processor having a processor core 122. However, in other embodiments, the processor 120 may be embodied as a multi-core processor having multiple processor cores 122. Additionally, the mobile computing device 102 may include additional processors 120 having one or more processor cores 122.

The chipset 124 of the mobile computing device 102 may include a memory controller hub (MCH or "northbridge"), an input/output controller hub (ICH or "southbridge"), and a firmware device. The firmware device of the chipset 124 may be embodied as a memory device for storing Basic Input/Output System (BIOS) data and/or instructions and/or other information (e.g., a BIOS driver used during booting of the mobile computing device 102). However, in other embodiments, chipsets having other configurations may be used. For example, in some embodiments, the chipset 124 may be embodied as a platform controller hub (PCH). In such embodiments, the memory controller hub (MCH) may be incorporated in or otherwise associated with the processor 120, and the processor 120 may communicate directly with the memory 126 (as shown by the hashed line in FIG. 1).

In some embodiments, the chipset 124 may include a security engine 132. The security engine 132 may be embodied as hardware and/or firmware configured to perform security, encryption, and/or authentication functions as described in more detail below. For example, the security engine 132 may be embodied as or otherwise include an out-of-band processor, a trusted platform module (TPM), and/or other security enhancing hardware and/or associated software modules. As discussed in more detail below, the security engine 132 may be used to encrypt location information indicative of the location of the mobile computing device 102 prior to transmitting the encrypted location information to the e-commerce vendor server 104. In this way, the security engine 132 provides an amount of trust for the location information.

The processor 120 is communicatively coupled to the chipset 124 via a number of signal paths. These signal paths (and other signal paths illustrated in FIG. 1) may be embodied as any type of signal paths capable of facilitating communication between the components of the mobile computing device 102. For example, the signal paths may be embodied as any number of wires, cables, light guides, printed circuit board traces, via, bus, intervening devices, and/or the like.

The memory 126 of the mobile computing device 102 may be embodied as one or more memory devices or data storage locations including, for example, dynamic random access memory devices (DRAM), synchronous dynamic random access memory devices (SDRAM), double-data rate synchronous dynamic random access memory device (DDR SDRAM), flash memory devices, and/or other volatile memory devices. The memory 126 is communicatively coupled to the chipset 124 via a number of signal paths. Although only a single memory device 126 is illustrated in FIG. 1, in other embodiments, the mobile computing device 102 may include additional memory devices. Various data and software may be stored in the memory device 126. For example, one or more operating systems, applications, programs, libraries, and drivers that make up the software stack executed by the processor 120 may reside in memory 126 during execution. Furthermore, software and data stored in memory 126 may be swapped between the memory 126 and a data storage device of the peripheral devices 128 as part of memory management operations.

The peripheral devices 128 of the mobile computing device 102 may include any number of peripheral or interface devices. For example, the peripheral devices 128 may include a display, a keyboard, a mouse, one or more data storage devices such as an internal or external hard drive, and/or other peripheral devices. The particular devices included in the peripheral devices 128 may depend upon, for example, the intended use of the mobile computing device 102. The peripheral devices 128 are communicatively coupled to the chipset 124 via a number of signal paths thereby allowing the chipset 124 and/or processor 120 to receive inputs from and send outputs to the peripheral devices 128.

The communication circuitry 130 of the mobile computing device 102 may be embodied as any number of devices and circuitry for enabling communications between the mobile computing device 102 and the e-commerce vendor server 104 over the network 110. The communication circuitry 130 is communicatively coupled to the chipset 124 via a number of signal paths. The communication circuitry 130 may include one or more wired and/or wireless network interfaces to facilitate communications over the wired and/or wireless portions of the network 110.

The network 110 may be embodied as any number of various wired and/or wireless telecommunication networks. For example, the network 110 may be embodied as or otherwise include one or more cellular networks, telephone networks, local or wide area networks publicly available global networks (e.g., the Internet), or any combination thereof. Furthermore, the network 110 may include any number of additional devices to facilitate communication between the mobile computing device 102 and the e-commerce vendor server 104 such as routers, switches, intervening computers, and/or the like. The mobile computing device 102 and the e-commerce vendor server 104 may use any suitable communication protocol to communicate with each other over the network 110 depending on, for example, the particular type of network(s) 110.

In some embodiments, the mobile computing device 102 may also include Global Positioning System (GPS) circuitry 134. In such embodiments, the GPS circuitry 134 is configured to generate coordinate data indicative of the location of the mobile computing device 102. As discussed in more detail below, the coordinate data may be transmitted to the e-commerce vendor server 104 in response to a request received from the server 104 or otherwise as part of the ordering process. In embodiments in which the mobile computing device 102 also includes the security engine 132, the GPS coordinate data generated by the GPS circuitry 134 may be encrypted by the security engine 132 prior to transmission.

The e-commerce vendor server 104 may be embodied as any type of computer server or other computing device capable of performing the functions described herein. In the illustrative embodiment of FIG. 1, the e-commerce vendor server 104 includes a processor 140, a chipset 144, a memory 146, one or more peripheral devices 148, and communication circuitry 150. In some embodiments, several of the foregoing components may be incorporated on a motherboard of the e-commerce vendor server 104, while other components may be communicatively coupled to the motherboard via, for example, a peripheral port. Furthermore, it should be appreciated that the e-commerce vendor server 104 may include other components, sub-components, and devices commonly found in a computer server, which are not illustrated in FIG. 1 for clarity of the description.

The processor 140 of the e-commerce vendor server 104 may be embodied as any type of processor capable of executing software/firmware, such as a microprocessor, digital signal processor, microcontroller, or the like. The processor 140 is illustratively embodied as a single core processor having a processor core 142. However, in other embodiments, the processor 140 may be embodied as a multi-core processor having multiple processor cores 142. Additionally, the e-commerce vendor server 104 may include additional processors 120 having one or more processor cores 122.

The chipset 144 of the e-commerce vendor server 104 may include a memory controller hub (MCH or "northbridge"), an input/output controller hub (ICH or "southbridge"), and a firmware device. The firmware device of the chipset 144 may be embodied as a memory device for storing Basic Input/Output System (BIOS) data and/or instructions and/or other information (e.g., a BIOS driver used during booting of the e-commerce vendor server 104). However, in other embodiments, chipsets having other configurations may be used.

Similar to chipset 124 of the mobile computing device 102, the chipset 144 may include a security engine 152 in some embodiments. The security engine 152 may be embodied as hardware and/or firmware configured to perform security, encryption, and/or authentication functions as described in more detail below. For example, the security engine 152 may be embodied as or otherwise include an out-of-band processor, a trusted platform module (TPM), and/or other security enhancing hardware and/or associated software modules. As discussed in more detail below, the security engine 152 receives encrypted location data from the mobile computing device 102, decrypt the encrypted location data, and transmit decrypted location data to the payment authorization server 106. However, in other embodiments, the decryption of the encrypted location data may occur at the payment authorization server 106 rather than at the e-commerce vendor server 104.

The processor 140 is communicatively coupled to the chipset 144 via a number of signal paths. Similar to the signal paths of the mobile computing device 102, the signal paths of the e-commerce vendor server 104 may be embodied as any type of signal paths capable of facilitating communication between the components of the e-commerce vendor server 104. For example, the signal paths may be embodied as any number of wires, cables, light guides, printed circuit board traces, via, bus, intervening devices, and/or the like.

The memory 146 of the e-commerce vendor server 104 may be embodied as one or more memory devices or data storage locations including, for example, dynamic random access memory devices (DRAM), synchronous dynamic random access memory devices (SDRAM), double-data rate synchronous dynamic random access memory device (DDR SDRAM), flash memory devices, and/or other volatile memory devices. The memory 146 is communicatively coupled to the chipset 144 via a number of signal paths. Although only a single memory device 146 is illustrated in FIG. 1, in other embodiments, the e-commerce vendor server 104 may include additional memory devices. Various data and software may be stored in the memory device 146. For example, one or more operating systems, applications, programs, libraries, and drivers that make up the software stack executed by the processor 140 may reside in memory 146 during execution. Furthermore, software and data stored in memory 146 may be swapped between the memory 146 and a data storage device of the peripheral devices 148 as part of memory management operations.

The peripheral devices 148 of the e-commerce vendor server 104 may include any number of peripheral or interface devices. For example, the peripheral devices 148 may include a display, a keyboard, a mouse, one or more data storage devices such as an internal or external hard drive, and/or other peripheral devices. The peripheral devices 148 are communicatively coupled to the chipset 144 via a number of signal paths thereby allowing the chipset 144 and/or processor 140 to receive inputs from and send outputs to the peripheral devices 148.

The communication circuitry 150 of the mobile e-commerce vendor server 104 may be embodied as any number of devices and circuitry for enabling communications between the e-commerce vendor server 104 and the mobile computing device 102 over the network 110 and between the e-commerce vendor server 104 and the payment authorization server 106 over the network 112. The communication circuitry 150 is communicatively coupled to the chipset 144 via a number of signal paths. The communication circuitry 150 may include one or more wired and/or wireless network interfaces to facilitate communications over the wired and/or wireless portions of the networks 110, 112.

The network 112 may be separate from or form a portion of the network 110. As such, the network 112 may be embodied as any number of various wired and/or wireless telecommunication networks. For example, the network 112 may be embodied as or otherwise include one or more cellular networks, telephone networks, local or wide area networks, publicly available global networks (e.g., the Internet), or any combination thereof. Furthermore, the network 112 may include any number of additional devices to facilitate communication between the servers 104, 106 such as routers, switches, intervening computers, and/or the like. The servers 104, 106 may use any suitable communication protocol to communicate with each other over the network 112 depending on, for example, the particular type of network(s) 112.

The payment authorization server 106 may be substantially similar to the e-commerce vendor server 104 and may be embodied as any type of computer server or computing device capable of performing the functions described herein. As such, the payment authorization server 106 may include components substantially similar to, although not necessarily identical, to the corresponding components of the e-commerce vendor server 104. For example, the payment authorization server 106 may include components similar to the processor 140, the chipset 144, the memory 146, the one or more peripheral devices 148, and the communication circuitry 150 of the e-commerce vendor server 104. As such, the above-provided description of the processor 140, the processor core(s) 142, the chipset 144, the memory 146, the peripheral devices 148, and the communication circuitry 150, of the e-commerce vendor server 104 is equally applicable to the payment authorization server 106 and is not repeated herein for clarity of the description.

The payment authorization server 106 is configured to authorize payment of the order placed at the e-commerce vendor server 104 by a user of the mobile computing device 102. The payment authorization server 106 may be operated, for example, by the issuing company of a particular credit/charge card account owned by the user, by a bank at which the user has a money account, or by another entity. For example, in some embodiments, the payment authorization server 106 may be operated by the e-commerce vendor of the e-commerce vendor server 104.

The illustrative payment authorization server 106 also includes a security engine 160, a location determination module 162, a payment authentication module 164, and a location authorization policy database 166. Each of the security engine 160, the modules 162, 164, and the database 166 may be embodied as hardware and/or software components configured to perform the functions described in more detail below. For example, the security engine 160 may be embodied as or otherwise include an out-of-band processor, a trusted platform module (TPM), and/or other security enhancing hardware and/or associated software modules. As discussed in more detail below, the security engine 160 is configured to receive encrypted location data from the e-commerce vendor server 104 and decrypt the encrypted location data.

The location determination module 162 is configured to determine the location of the mobile computing device 102 based on the location data received from the e-commerce vendor server 104, which may be decrypted by the security engine 160 if needed. To do so, the location determination module 162 may communicate with other servers or computing devices to, for example, cross-reference the location information to the location of the mobile computing device 102. For example, in embodiments wherein the location data is embodied as an IP address, the location determination module 162 may communicate with another server to cross-reference the IP address to a location (e.g., a coordinate value, a street address, a city, a state, etc).

The payment authentication module 164 is configured to determine whether to authorize or deny the payment request received from the e-commerce vendor server 104. To do so, the payment authentication module 164 may compare the location of the mobile computing device 102 as determined by the location determination module 162 to a location authorization policy stored in the database 166. For example, the payment authentication module 164 may determine whether the website of the e-commerce vendor server 104, which was used to place the order by the mobile computing device 102, is authorized for the location of the mobile computing device 102 as determined by the location determination module 162. As discussed in more detail below, such determination may be based on additional criteria such as the particular credit/charge card account used, the currency amount of the order, periodicity of recent orders, and the like.

The payment authentication module 164 may be configured to use any type of location authorization policy capable of correlating the location of the mobile computing device 102 to an allowed website address. For example, one embodiment of a location authorization policy 200 is illustrated in FIG. 2. In the policy 200, each pre-defined location is correlated to an authorized vendor or vendor website address. As such, the payment authentication module 164 may compare the determined location of the mobile computing device 102 to the policy 200 to determine whether the particular e-commerce vendor website is allowed at that location. As shown in FIG. 2, each pre-defined location may be correlated to one or more authorized e-commerce vendor websites. If the location is associated with a particular e-commerce vendor website, purchases from that vendor website may be made while the mobile computing device 102 is at that location. Conversely, if the location is not associated with a particular e-commerce vendor website, purchases from that vendor website may not be made while the mobile computing device 102 is at that location. It should be appreciated that the location authorization policy may include multiple levels of authorization. For example, although the location "HOME CITY" is only associated with two authorized vendors, the vendors associated with other locations may also be accessible from the "HOME CITY" location. As such, the "HOME CITY" location has a higher level of authorization than other locations, such as "CHINA," at which only the vendor "CHINAHOTEL.COM" can be accessed. In this way, locations identified in the location authorization policy 200 may have one-to-one, one-to-many, or many-to-many relationships with website vendors.

As shown in FIG. 2, the location authorization policy 200 may include other criteria in addition to the location-to-website verification. For example, for each location-website pair, the policy 200 may identify a maximum currency amount for each purchase. Additionally, other conditions or criteria may be used such as a purchase period limitation that limits the number of purchases that may be made from a particular e-commerce website when the mobile computing device 102 is at a particular location.

It should be appreciated that in other embodiments additional conditions or criteria may be incorporated into the policy 200. For example, in some embodiments, a separate location data security policy may be established for each location. That is, the user of the mobile computing device 102 may identify locations at which the location data generated by or otherwise transmitted by the mobile computing device 102 is only authorized for use by payment authorization server 106 and/or e-commerce vendor server 104 if the location data was transmitted in an encrypted format, which may be accomplished via the security engine 132 (e.g., a trusted platform module (TPM) or other security hardware and/or associated software modules). For example, the user may identify a particular city or cities (e.g., Portland, Oreg. and San Francisco, Calif.) at which all location data transmitted from the mobile computing device 102 is authorized only if encrypted. The user may also identify other locations (e.g., London, England) at which location data may be transmitted from the mobile computing device 102 in an unprotected or otherwise unencrypted form. Additionally, such location data security policies may be based on other criteria instead of or in addition to the location. For example, the user may authorize the use of unencrypted location data at London, England only within a predetermined time/date range (e.g., only between the dates of Jul. 22, 2010 and Jul. 25, 2010). Such location data security policies may increase security from malicious attacks that attempt to proxy locations at which only encrypted location data has been authorized.

Additionally, it should be appreciated that in other embodiments, other location authorization policies or data schemas may be used. For example, as illustrated in FIG. 3, each e-commerce vendor web site may be correlated to authorized locations and other conditions or criteria. As such, it should be appreciated that the location authorization policy may use any schema capable of cross-referencing a location of the mobile computing device 102 and authorized e-commerce vendors.

As discussed in more detail below, the location authorization polices 200, 300 may be generated based on data supplied by a user of the mobile computing device 102. As such, in some embodiments, the e-commerce vendor server 104 may also include a local location authorization policy database and authorization module. The user may register with the payment authorization server 106 and/or e-commerce vendor server 104 to identify those locations at which purchases from the e-commerce vendor should be allowed or denied. Such registrations processes may be automated or manual as discussed below.

Figure 4:
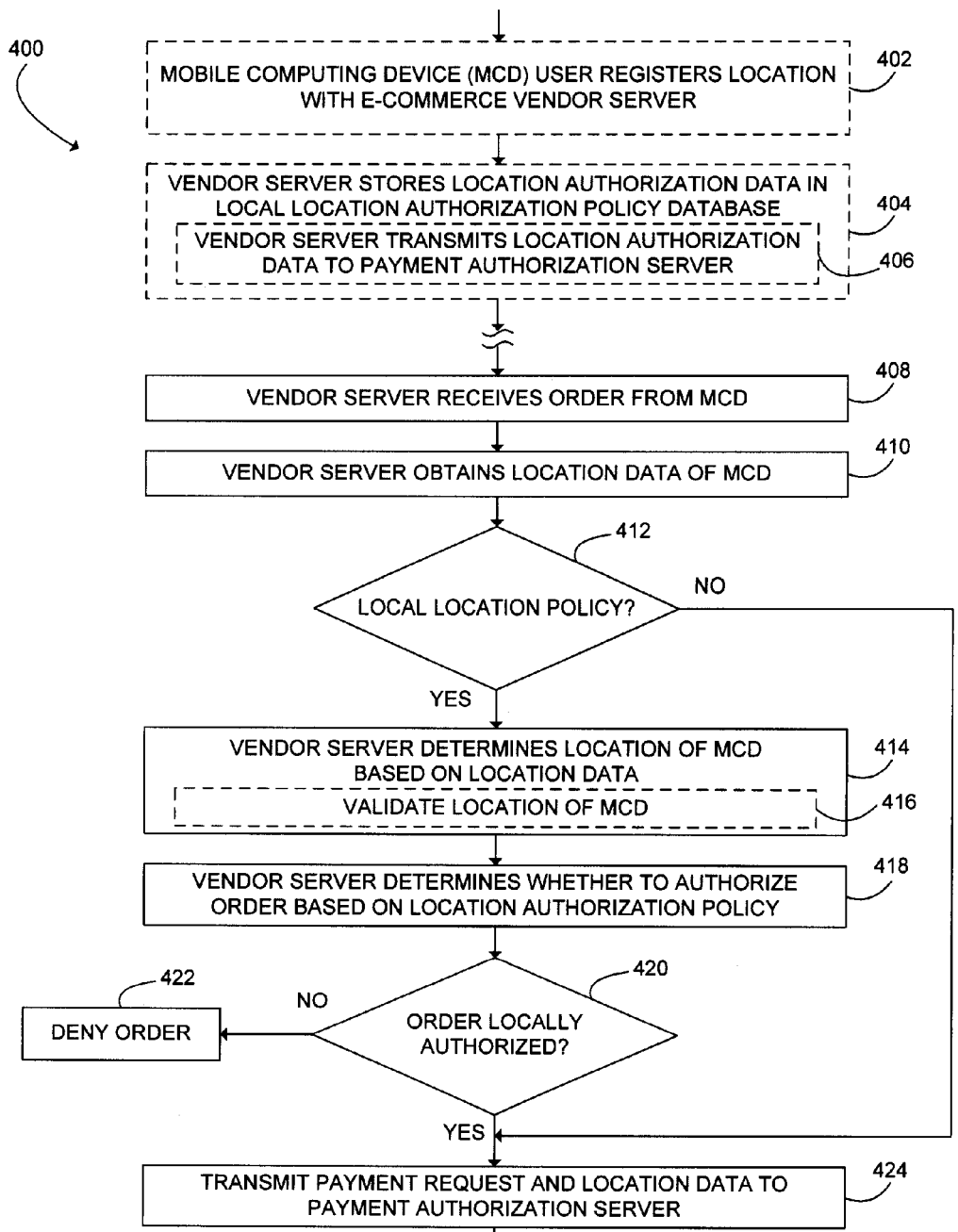
FIG. 4 is a simplified flow diagram of one embodiment of a method for authorizing orders, which may be executed by a e-commerce vendor server of the system of FIG. 1.

Referring now to FIG. 4, a method 400 for authorizing orders placed by a user of the mobile computing device 102 may be executed by the e-commerce vendor server 104. As discussed above, in some embodiments, the user of the mobile computing device 102 may register with the e-commerce vendor server 104 in addition to the payment authorization server 106. As such, the method 400 beings with block 402 in which the user registers with the e-commerce vendor server 104 to identify those locations at which purchases from the e-commerce vendor are authorized. The registration process may be automated or manual. For example, the user may access the e-commerce website while the mobile computing device 102 is at a particular location to register that particular location with the e-commerce vendor server 104. In this way, the user is not required to identify each specific location but may rather register locations over time. Alternatively, the user may simply contact the e-commerce vendor (e.g., via telephone) to register one or more locations with the e-commerce vendor.

In block 404, the vendor server 104 stores the registration data that identifies authorized locations for the e-commerce vendor website in a location authorization policy database. Such database may form a portion of the vendor server 104 as discussed above. Additionally, in some embodiments, the registration data may be transmitted from the vendor server 104 to the payment authorization server 106 so that the server 106 may update the location authorization policy database to include any new authorized location-website pairing.

In block 408, the e-commerce vendor server 104 may receive an order from a user of the mobile computing device 102. The order may be embodied as, for example, an online purchase of good and/or services from the e-commerce vendor server 104 received from the mobile computing device 102. In block 410, the e-commerce vendor server 104 obtains location data that is indicative of the location of the mobile computing device 102. As discussed above, the location data may be indirect location data such as the IP address of the mobile computing device 102 used to place the order or the Base Set Service Identifier (BSSID) of an access point used by the mobile computing device 102. Additionally or alternatively, the location data may be embodied as direct location data such as GPS coordinates or coordinates generated from a cellular triangulation procedure in those embodiments wherein the communication circuitry 130 of the mobile computing device 102 is embodied as a cellular modem.

In some embodiments, the location data is obtained directly from the mobile computing device 102 (e.g., the IP address of the mobile computing device 102, the GPS coordinates in embodiments wherein the device 102 includes the GPS circuitry 134) or may be obtained from another computing device or server (e.g., a server providing the cellular triangulation coordinates of a cellular communication circuitry 130). Additionally, as discussed above, the location data transmitted by the mobile computing device 102 may be encrypted in some embodiments. If so, the e-commerce vendor server 104 may be configured to decrypt the location data.

In block 412, the e-commerce vendor server 104 determines whether a location authorization policy is available. As discussed above, in some embodiments, the e-commerce vendor server 104 may use a local location authorization policy to authorize the order placed by the mobile computing device 102 prior to sending the payment request to the payment authorization server 106. If the e-commerce vendor server 104 does not include a local location authorization policy database, the method 400 advances to block 424 wherein the vendor server 104 transmits a payment request for the order placed by the user of the mobile computing device 102 and the location data obtained in block 410 to the payment authorization server 106. As discussed below in regard to FIG. 5, the payment authorization server 106 uses the location data to determine whether to authorize the payment request.

Referring back to block 412, if the e-commerce vendor server 104 does include a location authorization policy database, the vendor server 104 determines the location of the mobile computing device 102 in block 414. To do so, the vendor server 104 may cross-reference the location data to the location of the mobile computing device 102 at the time of submission of the order to the e-commerce vendor server 104. In some embodiments, the vendor server 104 may communicate with other servers and/or computing devices to determine the location of the mobile computing device 102. For example, in embodiments in which the location data is embodied as the IP address of the mobile computing device 102, the vendor server 104 may communicate with another server configured to cross-reference the IP address to a location. Alternatively, in other embodiments, the vendor server 104 may not be required to communicate with other servers to determine the location of the mobile computing device 102. For example, in embodiments wherein the location data is embodied as GPS coordinates, the GPS coordinates may be used as the location of the mobile computing device 102. In this way, the determined location of the mobile computing device 102 may be of varying granulations based on the particular embodiment and implementation. For example, the determined location may be embodied as GPS coordinates, a street address, a city, a state, a country, a region, or other location.

In some embodiments, the e-commerce vendor server 104 may be configured to validate the location of the mobile computing device 102 in block 416. To do so, the e-commerce vendor server 104 may trace the IP path to determine an origination location from which the order to the e-commerce vendor server 104 was submitted. If the origination location does not match the location determined based on the IP address of the mobile computing device 102, the e-commerce vendor server 104 may determine that the order is fraudulent and deny the order as discussed below. For example, the IP address of the mobile computing device 102 identifies the location of the mobile computing device 102 as being within the United States but the origination location obtained by tracking the IP path is located outside of the United States, the order may be fraudulent.

In block 418, the e-commerce vendor server 104 determines whether to authorize the order. To do so, the vendor server 104 may compare the location of the mobile computing device 102 determined in block 410 to the local location policy. Additionally, the vendor server 104 may determine whether the order satisfies any additional criteria or conditions such as those illustrated in and discussed above in regard to FIGS. 2 and 3. For example, the vendor server 104 may determine whether the amount of the order is below the authorized maximum for the determined location and/or authorized vendor, whether too many purchases have been made within a predetermined time period, and/or other conditions or criteria.

If the location of the mobile computing device 102 is not authorized for the particular e-commerce vendor website, the vendor server 104 denies the order in block 422. Alternatively, if the location of the mobile computing device 102 is authorized for the particular e-commerce vendor website, the vendor server 104 authorizes the order and subsequently transmits a payment request for the order of goods/services, and the location data obtained in block 410, to the payment authorization server 106 in block 424. In this way, varying levels of location-based authorization of e-commerce purchases may be established.

Figure 5:
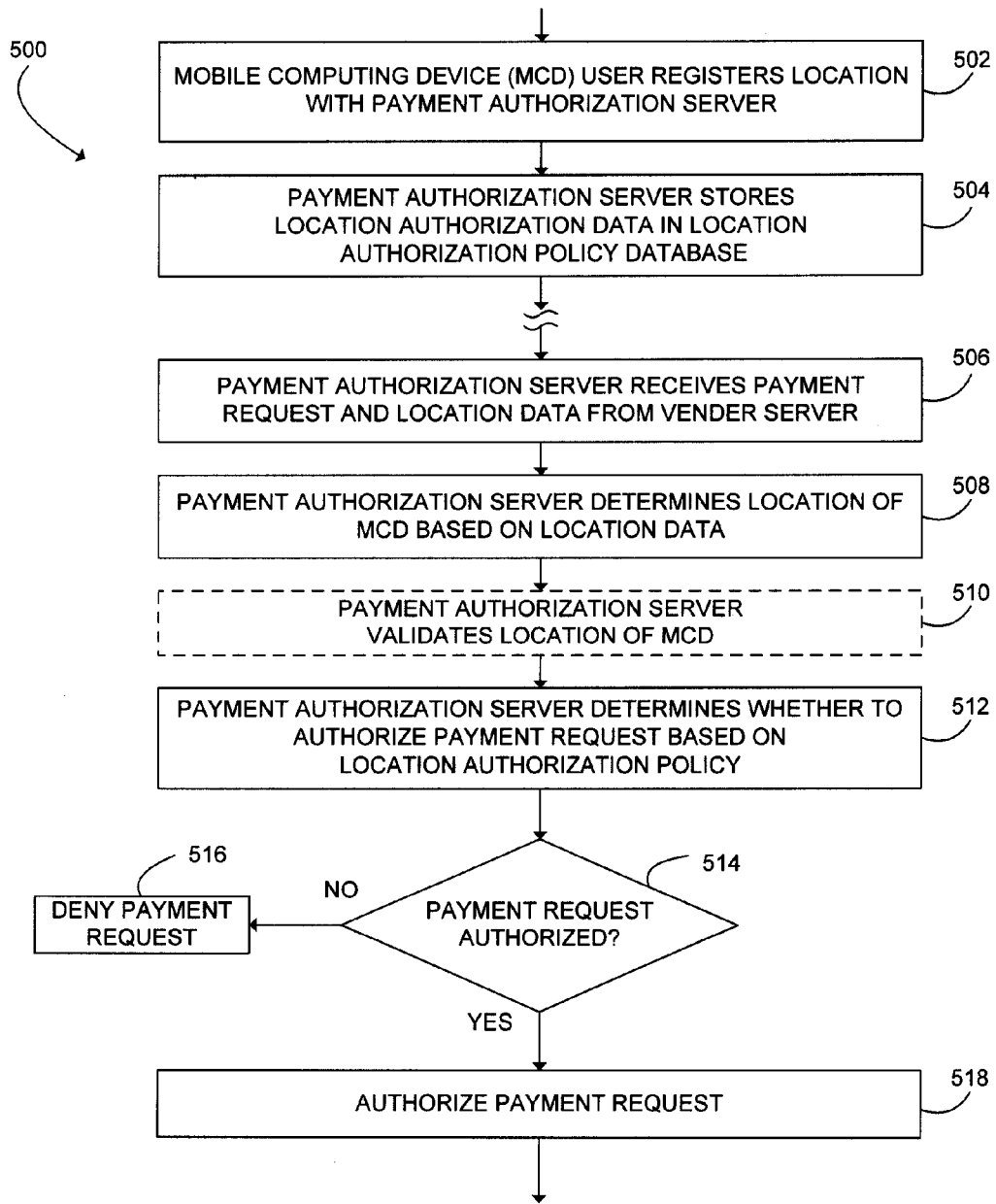
FIG. 5 is a simplified flow diagram of one embodiment of a method for authorizing payment requests, which may be executed by a payment authorization server of the system of FIG. 1.

Referring now to FIG. 5, a method 500 for location-based authorization of a payment request, which may be executed by the payment authorization server 106, begins with block 502. In block 502, the user may register with the payment authorization server 106 to identify locations at which purchases from particular e-commerce vendors are authorized. As discussed above in regard to block 402 of the method 400, the registration process may be automated or manual. For example, the user may access the payment authorization server 106 while the mobile computing device 102 is at a particular location to register automatically that particular location with the payment authorization server 106. Alternatively, the user may simply contact the payment authorization service (e.g., the credit card company or bank) to register one or more locations and e-commerce vendor pairings.

In block 504, the payment authorization server 106 stores the registration data (i.e., the location-vendor pairing) in the location authorization policy database 166. As discussed above in regard to FIGS. 2 and 3, the location authorization policy database 166 may use any database schema capable of cross-referencing locations and authorized e-commerce websites.

In block 506, the payment authorization server 106 receives a payment request for an order from the e-commerce vendor server 104. Additionally, the payment authorization server 106 may receive location data from the vendor server 104. In block 508, the payment authorization server 106 determines the location of the mobile computing device 102 based on the location data. To do so, the payment authorization server 106 may cross-reference the location data to the location of the mobile computing device 102 as discussed above in regard to block 414 of the method 400. In some embodiments, the payment authorization server 106 may communicate with other servers and/or computing devices to determine the location of the mobile computing device 102. For example, in embodiments in which the location data is embodied as the IP address of the mobile computing device 102 or a Basic Service Set Identifier (BSSID) of an access point used by the mobile computing device 102, the payment authorization server 106 may communicate with another server configured to cross-reference the IP address to a location. Alternatively, in other embodiments, the payment authorization server 106 may not be required to communicate with other servers to determine the location of the mobile computing device 102 (e.g., in embodiments in which the location data is embodied as GPS or cellular triangulation coordinates). In this way, the determined location of the mobile computing device 102 may be of varying granulations based on the particular embodiment and implementation. For example, the determined location may be embodied as GPS coordinates, a street address, a city, a state, a country, a region, or other location.

In some embodiments, the payment authorization server 106 may be configured to validate the location of the mobile computing device 102 in block 510. To do so, the payment authorization server 106 may trace the IP path to determine an origination location from which the order to the e-commerce vendor server 104 was submitted and compare the origination location to the location determined based on the IP address of the mobile computing device 102 as discussed above. If the two locations do not match, the payment authorization server 106 may determine the order is fraudulent and deny the payment request.

In blocks 512 and 514, the payment authorization server 106 determines whether to authorize the payment request. To do so, the payment authorization server 106 may compare the location of the mobile computing device 102 determined in block 508 to the location authorization policy stored in the database 166. Additionally, the payment authorization server 106 may determine whether the order satisfies any additional criteria or conditions such as those illustrated in and discussed above in regard to FIGS. 2 and 3. For example, the payment authorization server 106 may determine whether the amount of the order is below the authorized maximum for the determined location and/or authorized vendor, whether too many purchases have been made within a predetermined time period, and/or other conditions or criteria.

If the e-commerce vendor website is not identified in the location authorization policy as being authorized for the determined location of the mobile computing device 102 or if the additional criteria is not satisfied (e.g., the order amount is greater than the authorized maximum), the payment authorization server 106 may deny the payment request in block 516. Alternatively, if the e-commerce vendor website is identified in the location authorization policy as being authorized for the determined location of the mobile computing device 102 (and any additional criteria is satisfied), the payment authorization server 106 may authorize the payment request in block 518. In some embodiments, the payment authorization server 106 may also process the payment request in block 518 to, for example, debit or apply the transaction to the account of the user of the mobile computing device 102. In this way, payment requests for orders submitted via a mobile computing device 102 may be authorized based on the location of the mobile computing device 102 to increase the overall security of the system 100 against fraudulent use.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

The invention claimed is:

1. A method comprising:
   receiving, on a server, a payment request for an order submitted from a mobile computing device;
   receiving, on the server, location data indicative of the location of the mobile computing device;
   determining, on the server, a location of the mobile computing device using the location data;
   retrieving location authorization policy data from a database, wherein the location authorization policy data identifies a first location of the mobile computing device in which payment may be authorized only if the location data is transmitted in an encrypted format and a second location of the mobile computing device in which the payment may be authorized if the location data is transmitted in either an encrypted or an unencrypted format; and
   determining whether to authorize the payment request based on the location authorization policy data of the mobile computing device.

2. The method of claim 1, wherein receiving the payment request comprises receiving, from a remote e-commerce vendor server, the payment request for the order submitted from the mobile computing device.

3. The method of claim 1, wherein receiving the payment request comprises receiving a payment request including account information of a user of the mobile computing device.

4. The method of claim 1, wherein receiving the location data comprises receiving an Internet Protocol address of the mobile computing device at the time of submission of the order, and
   wherein determining the location of the mobile computing device comprises cross-referencing the Internet Protocol address to the location of the mobile computing device.

5. The method of claim 4, wherein the received Internet Protocol address is a first Internet Protocol address and the determined location is a first location, and further comprising:
   validating the determined location of the mobile computing device by (i) tracing the order to determine a second Internet Protocol address from which the order originated, (ii) determining a second location using the second Internet Protocol address, and (iii) comparing the second location to the first location.

6. The method of claim 1, wherein receiving the location data comprises receiving a Basic Service Set Identifier (BSSID) of an access point used by the mobile computing device to submit the order, and
   wherein determining the location of the mobile computing device comprises cross-referencing the Basic Service Set Identifier to the location of the access point.

7. The method of claim 1, wherein receiving the location data comprises receiving coordinate data generated from a cellular triangulation procedure, the coordinate data being indicative of the location of the mobile computing device at the time of submission of the order.

8. The method of claim 1, wherein receiving the location data comprises receiving Global Positioning System (GPS) coordinates of the mobile computing device at the time of submission of the order.

9. The method of claim 1, wherein determining whether to authorize the payment request comprises retrieving location authorization policy data from a database and comparing the determined location to the location authorization policy data.

10. The method of claim 9, wherein retrieving the location authorization policy data comprises retrieving location authorization policy data that is updated based on input from a user of the mobile computing device that identifies authorized e-commerce vendor websites with a current location of the mobile computing device.

11. The method of claim 1, wherein retrieving the location authorization policy data comprising retrieving location authorization policy data that includes an authorized vendor website having a first currency limit for a first location of the mobile computing device and a second currency limit for a second location of the mobile computing device.

12. The method of claim 1, wherein retrieving the location authorization policy data comprising retrieving location authorization policy data that includes a location of the mobile computing device having a first currency limit for a first authorized vendor website and a second currency limit for a second authorized vendor website.

13. One or more tangible, machine readable media comprising a plurality of instructions that in response to being executed result in a computing device:
   receiving a payment request for an order submitted from a mobile computing device via an e-commerce vendor website;
   receiving location data indicative of the location of the mobile computing device;

determining a location of the mobile computing device using the location data;

retrieving location authorization policy data, wherein the location authorization policy data identifies a first location of the mobile computing device in which payment may be authorized only if the location data is transmitted in an encrypted format and a second location of the mobile computing device in which the payment may be authorized if the location data is transmitted in either an encrypted or an unencrypted format; and processing the payment request only if the payment is authorized by the location authorization policy data.

14. The one or more tangible, machine readable media of claim 13, wherein determining the location of the mobile computing device comprises determining the location of the mobile computing device at the time of submission of the order using the location data.

15. The one or more tangible, machine readable media of claim 13, wherein receiving a payment request for an order comprises receiving a payment request including account information of an account of a user of the mobile computing device.

16. The one or more tangible, machine readable media of claim 15, wherein processing the payment request comprises debiting the user's account.

17. The one or more tangible, machine readable media of claim 13, wherein retrieving the location authorization policy data comprises retrieving location authorization policy data, wherein the location authorization policy data includes an e-commerce vendor website with a first currency limit for a first location of the mobile computing device and a second currency limit for a second location of the mobile computing device.

18. A server comprising:

a database including a location authorization policy that (i) associates a currency limit with an e-commerce vendor website and a location of a mobile computing device and (ii) identifies a first location of the mobile computing device in which payment may be authorized only if location data is transmitted in an encrypted format and a second location of the mobile computing device in which the payment may be authorized if the location data is transmitted in either an encrypted or an unencrypted format;

a processor; and a memory device having stored therein a plurality of instructions, which when executed by the processor, cause the processor to:

receive a payment request for an order submitted from the mobile computing device via the e-commerce vendor website;

determine the location of the mobile computing device based on the location data received with the payment request; and authorize the payment request in response to the payment being authorized in the location authorization policy.

19. The server of claim 18, wherein the plurality of instructions further cause the processor to update the location authorization policy based on data input supplied by a user of the mobile computing device, the data input identifying allowed websites for a predetermined location of the mobile computing device.

20. The server of claim 18, wherein the database includes the location authorization policy, the location authorization policy including an e-commerce vendor website with a first currency limit for a first location of the mobile computing device and a second currency limit for a second location of the mobile computing device.

\* \* \* \* \*